United States Patent
Wenk

(10) Patent No.: US 11,525,536 B2
(45) Date of Patent: Dec. 13, 2022

(54) SEALING DEVICE AND ASSOCIATED INNER SLEEVE

(71) Applicant: Christoph Wenk, Hage (DE)

(72) Inventor: Christoph Wenk, Hage (DE)

(*) Notice: Subject to any disclaimer, the term of this patent is extended or adjusted under 35 U.S.C. 154(b) by 0 days.

(21) Appl. No.: 17/256,481

(22) PCT Filed: Jun. 4, 2019

(86) PCT No.: PCT/EP2019/064424
§ 371 (c)(1),
(2) Date: Dec. 28, 2020

(87) PCT Pub. No.: WO2020/001929
PCT Pub. Date: Jan. 2, 2020

(65) Prior Publication Data
US 2021/0131602 A1    May 6, 2021

(30) Foreign Application Priority Data
Jun. 28, 2018   (DE) .......................... 102018115678.2

(51) Int. Cl.
*F16L 55/163*  (2006.01)
*F16L 55/179*  (2006.01)

(52) U.S. Cl.
CPC ........... *F16L 55/163* (2013.01); *F16L 55/179* (2013.01)

(58) Field of Classification Search
CPC ... F16L 55/163; F16L 55/179; F16L 55/1651; F16L 55/1654
USPC .................. 138/98, 97; 405/150.1, 184.2
See application file for complete search history.

(56) References Cited

U.S. PATENT DOCUMENTS

| | | | | |
|---|---|---|---|---|
| 5,465,758 A * | 11/1995 | Graf | ...................... | F16L 55/163 |
| | | | | 138/97 |
| 5,967,192 A * | 10/1999 | Lewin | ................... | F16L 55/179 |
| | | | | 138/96 R |
| 6,994,118 B2 * | 2/2006 | Kiest, Jr. | ............. | F16L 55/1654 |
| | | | | 138/98 |
| 8,689,835 B2 * | 4/2014 | Kiest, Jr. | ............. | F16L 55/1656 |
| | | | | 138/98 |
| 8,801,329 B2 * | 8/2014 | Bateman | ............... | F16L 55/165 |
| | | | | 405/184.2 |
| 8,869,839 B1 * | 10/2014 | D'Hulster | ............. | F16L 55/179 |
| | | | | 138/98 |
| 9,506,596 B2 * | 11/2016 | Kiest, Jr. | ............... | B23P 11/022 |
| 9,574,695 B2 * | 2/2017 | Graf | ...................... | F16L 55/163 |
| 2005/0092382 A1* | 5/2005 | Muhlin | ..................... | E03F 3/06 |
| | | | | 138/98 |

(Continued)

FOREIGN PATENT DOCUMENTS

| | | | |
|---|---|---|---|
| DE | 19631082 A1 | 2/1997 | |
| DE | 19910522 C1 | 12/2000 | |

(Continued)

*Primary Examiner* — Patrick F Brinson
(74) *Attorney, Agent, or Firm* — Husch Blackwell LLP

(57) ABSTRACT

A sealing device is provided for sealing a transition between a main line and a branch line. An insert has a main part disposed in the main line. A connector is disposed in the branch line. A first expandable inner sleeve for bracing the main part in the main fine is provided, as well as at least a second expandable inner sleeve for bracing the connector in the branch line. An inner sleeve having a locking device is also provided.

25 Claims, 10 Drawing Sheets

(56) References Cited

U.S. PATENT DOCUMENTS

| | | | | |
|---|---|---|---|---|
| 2005/0133105 | A1* | 6/2005 | Criffo' | F16L 55/1654 |
| | | | | 138/98 |
| 2007/0261751 | A1* | 11/2007 | Lepola | F16L 55/1612 |
| | | | | 138/98 |
| 2008/0193221 | A1* | 8/2008 | Lee | F16L 55/163 |
| | | | | 405/184.2 |
| 2018/0169933 | A1* | 6/2018 | LaPorte | B29C 61/0625 |

FOREIGN PATENT DOCUMENTS

| | | |
|---|---|---|
| DE | 202016101481 U1 | 3/2016 |
| DE | 102015003515 A1 | 9/2016 |
| EP | 0805932 B1 | 1/2001 |
| GB | 2221010 A | 1/1990 |

\* cited by examiner

SEALING DEVICE AND ASSOCIATED INNER SLEEVE

CROSS REFERENCE

This application claims priority to PCT Application No. PCT/EP2019/064424, filed Jun. 4, 2019, which itself claims priority to German Application No. 10 2018 115 678.2, filed Jun. 28, 2018, the entirety of both of which are hereby incorporated by reference.

FIELD OF THE INVENTION

The present invention relates to a sealing device for sealing a transition between a main line and a branch line. The invention furthermore comprises an inner sleeve which can be used in particular in such a sealing device. The invention finally relates to a method for installing a sealing device in a main line and a branch line.

BACKGROUND

By virtue of displacements in the soil, for example, branches of a main line for fluids that are installed underground often have breakages in the immediate region of the connection between the branch line and the main line. Correspondingly, the fluid transported in the lines, for example drinking water, waste water, or else oil, can often leak unnoticed into the soil when this transition region from the branch line to a main line is damaged. Arbitrary T-shaped or Y-shaped regions of line are understood to be a branch line and a main line, wherein the branch line typically has a smaller available internal diameter of the pipe than the main line, this however not necessarily having to be the case. This can also be a fork, for example, at which a main line bifurcates into two branch lines of identical size. In this instance, a main line and one of the two branch lines are conjointly referred to as the main line for the purpose of the application, while the further branch line in this instance is the branch line in the context of this application.

A multiplicity of methods pertaining to how such damage, if at all detected, is subsequently sealed have already been proposed.

For example, a device and a method for sealing or rehabilitating, respectively, such a transition region is described in DE 10 2015 003 515 A1, in which method an insert which has a connector is braced in the main line. The inner sleeve of the sealing device herein is expediently configured such that any adjustment of the inner sleeve is possible only while enlarging the external diameter of the inner sleeve. The functional mode of the locking device is however not disclosed. In a likewise exemplary manner, reference here is to be made to the locking device according to EP 0 805 932 B1, which permits an expansion of the inner sleeve. Any reduction of the diameter per se, counter to the direction of expansion, is to be prevented by gear wheels that mesh in a blocking manner. It is however disadvantageous herein that, upon expansion of the inner sleeve, latching back to a position with a slightly smaller diameter takes place on account of the play in the gear wheels. Leakages between the insert and the inside of the pipeline are created on account thereof.

Moreover, the region surrounding the inner sleeve has to be injected and cured which makes for a complex, tedious method.

It is moreover known for a so-called "cap" to be incorporated into the branch line, said cap having a collar which is to be disposed on the main line and to be connected to a liner of the main line. That part of the cap that tapers in a conical manner is incorporated into the branch line. After having been incorporated, the cap is cured by UV radiation, for example. Leakages herein often arise already by virtue of an imprecise fit of the cap in the line. Moreover, stresses arise on the rigid cap when the soil is displaced yet again, said stresses in turn potentially leading to damage to the material of said cap in particular in the case of continuing damage to the main line or branch line. This can lead to heavier leakages.

SUMMARY OF THE INVENTION

It is an object of the present invention to improve the prior art in terms of the mentioned disadvantages and to provide in particular a sealing device that can be securely assembled.

This object is achieved by a sealing device according to claim 1 as well as by a method according to claim 23. An inner sleeve according to claim 22 is likewise the subject matter of the invention. Advantageous design embodiments of the respective inventions are to be derived from the dependent claims referring back to the independent claims, as well as from the description hereunder.

It is provided according to the invention that the sealing device for sealing a transition between a main line and a branch line comprises an insert with a main part to be disposed in the main line, and a connector to be disposed in the branch line, wherein a first expandable inner sleeve for bracing the main part in the main line, and at least a second expandable inner sleeve for bracing the connector in the branch line are provided. It has been surprisingly demonstrated that the same technique by way of which an insert or else a liner is braced in the main line is in principle suitable for ensuring a reliable fit of the connector in the branch line without any regions between the insert and the internal wall or the internal surface of the main line or the branch line, respectively, having to be filled. This is in particular not a connector which has to be cured by radiation, for example, or other curing methods that modify material properties. The insert herein can be adapted to the diameter of the pipeline such that said insert bears on the latter in a comparatively tight manner and on the external side of said insert that is directed toward the internal surface of the respective line bears tightly on this surface by means of potential seals. The surface can be configured, for example, by an internal surface, that is to say which surface points toward the line longitudinal central axis, of the line wall per se or of an incorporated liner.

The subject matter according to the invention has in particular a further, third inner sleeve for establishing the main part in the main line, wherein the two inner sleeves provided for establishing the main part are to be disposed so as to be mutually spaced apart and in particular on different sides in relation to the connector in the main line. For example, an insert of a T-shaped or Y-shaped configuration is thus in each case braced in the pipeline at all the open ends of said insert, such that a tight fit of the insert in the respective line, and thus sealing of the damaged location, is achieved independently of slight displacements of the main line and the branch line in relation to one another.

While it is possible for the insert on the inside of the inner sleeve to be disposed toward the longitudinal central axis of a pipeline, and for the inner sleeve to be braced in relation to the wall, according to a further configuration of the invention it is advantageous for at least one of the inner sleeves to be configured for being braced by way of the main part or by way of the connector in relation to the main line or in relation to the branch line. That region of the insert that is impinged with force by the inner sleeve is brought to bear directly on the internal surface. The installation of the insert by bracing the respective inner sleeve from the inside of the respective line is readily possible.

For improved integration and a correct fit of the inner sleeve, the insert on the inside can have contact faces that are adapted to the size of the inner sleeves. This simplifies a positive fit of the inner sleeves in the pipeline by way of recess regions, for example, and, on account of a smoother internal surface of the sealing device that is provided with fewer profiled features, facilitates a steadier fluid transport by said sealing device. The risk of sediment accumulation is also reduced.

According to one advantageous configuration of the invention, the main part and connector can be configured so as to be mutually integral.

Independently thereof, the connector can in particular have a degree of flexibility required for incorporating said connector into the main line. For example, for the purpose of incorporation in the pipeline, the connector can initially be disposed on the inside of the main part so as to then subsequently be inverted into the branch line.

The main part in the direction of the longitudinal extent of the main line is preferably configured so as to be so long that bracing by way of in each case one inner sleeve is possible on both sides of the region in which the connector is disposed.

Disposal of the sealing device in the lines is improved when, according to one further exemplary embodiment of the invention, the insert is configured in two parts, wherein the main part as well as the connector can in each case have an, in particular collar-shaped, sealing region which is configured for sealing the two parts of the insert in relation to one another. These can be profiled sealing regions, for example, which are configured with mutually complementary profiles that engage in one another. Alternatively or additionally, the main part and the connector can latch onto one another.

Depending on which sealing region in the main line is the external sealing region when viewed from a radial longitudinal axis of the respective fine, this sealing region of the connector and/or of the main part can have at least one seal which is to be disposed, or points, respectively, in the direction of an internal surface of the main line and/or branch line. To the extent that the respective collar-shaped sealing regions are to be disposed in the branch line, the seal would be disposed so as to seal in relation to an internal surface of the branch line. Otherwise, the sealing action would take place in relation to an internal surface of the main line.

For the purpose of an improved positioning of the connector in the branch line, said connector can likewise be positioned by way of two inner sleeves, wherein one sealing sleeve is positioned at the external end that is the most remote from the main part, while a further inner sleeve braces a main-line-proximal region of the connector in relation to the internal surface of the branch line.

The sealing region of the connector and/or the main part is advantageously configured to be so rigid that mutual positioning of the respective sealing regions, or contact faces, respectively, is readily possible. This herein can be a comparatively rigid collar of the connector which is provided with soft seals and enables the forces required for a tight fit to be distributed in a uniform manner.

The insert preferably has at least one fastening means for fastening the main part and the connector to one another, wherein said fastening means is in particular a latching means or a clamping means.

A configuration of the invention in which the main part is at least substantially an expandable, flexurally stiff molded part is particularly preferable. The main part is in particular flexurally stiff when, by expanding the main part, sufficiently great forces are applied for a tight fit in the sealing region toward the connector by virtue of the inner sleeves establishing said main part by virtue of the expansion. That is to say that a transmission of sufficiently great forces toward the seal of the connector in relation to an internal surface takes place without the main part bending at the expense of losing or avoiding the tight fit.

The molded part can in particular be such a molded part which when viewed in the longitudinal direction, and irrespective of any inner sleeves, is configured for covering the main line by not more than 270°. For improved handling in the duct, irrespective of any inner sleeves and a region which for the transmission into the connector configures a clearance, a shape of the main part that configures half a hollow cylinder is provided, for example.

The insert can in particular be configured so as to be at least substantially, thus in particular completely, from stainless steel. Alternatively or additionally, this can also be a thermosetting plastics material, a thermoplastics material, or a composite material, which is constructed in multiple layers and the properties thereof being in particular conceived with a view to the forces required for bracing the connector in relation to the main part. Moreover, the material of the sealing device can be adapted to the fluid to be transported.

In order to absorb any subsequent displacement by further movements of the soil, the connector at least in parts, preferably largely, or completely, respectively, is preferably configured so as to be permanently flexible, in particular from an elastomer such as, for example, soft rubber or a sufficiently flexible polyurethane. Moreover, the connector can have a wall region which is deflected multiple times, in which wall region said connector can be better adapted to the transition region. For example, a non-rectangular disposal on the duct can be achieved by way of said wall region. This can be achieved in an exemplary manner by a portion of the connector being configured in the manner of an accordion. On account of a permanently flexible configuration of the connector, the latter can be positioned in an improved manner and thus be further used by releasing the inner sleeve or inner sleeves, respectively, and re-attaching the inner sleeves, for example even after a leakage which nevertheless arises in the operation.

According to one further configuration of the invention, the sealing device can have at least one valve which is preferably configured by an eversion of the insert and by way of which a region between the insert and the internal wall of one of the lines is reachable. On account thereof, the region is situated between the insert and the internal wall of the pipeline can be injected, should this be desired by the operator of the pipeline. An eversion of the insert herein is an eversion in the radial direction away from a longitudinal central axis of a line to be viewed.

An inner sleeve can in particular be conjointly configured by the main part such that a transmission of the forces that arise on account of the expansion in the pipeline to the further region of the main part takes place in a reliable manner.

A disposal of the sealing device in a pipeline is furthermore improved when, according to one further exemplary embodiment of the invention, at least one inner sleeve is provided with a pre-loadable locking device. The locking device is pre-loadable when it has an additional tensioning means by way of which, before or after initial expansion and bracing in the pipeline, a force is stored in the inner sleeve, by virtue of which force the return to a position with a smaller external diameter by virtue of a dead distance, as observed in the prior art, is prevented.

The locking device advantageously comprises at least one force accumulator unit which is preferably configured as a spring element and pre-loaded by transferring the inner sleeve to an operating position. A force accumulator unit which is configured as a spring element in terms of construction can be adapted in an optimal manner to the insert used in the duct, for example as a particularly flat leaf spring or as a precisely guided spring bar.

The inner sleeve is in particular provided at least with one sleeve part provided for a force-fit or form-fit, and a further part of the inner sleeve that in the radial direction is adjacent to said sleeve part has the force accumulator unit having at least one counter element provided for the force-fit and/or form-fit. This herein can be, for example, a clamping closure in which a ball which is placed between two inclined planes bearing on one another and is guided along said planes leads to a clamping action.

The sleeve part particularly preferably has a toothing, wherein the counter element has at least one tooth which then engages in particular in said toothing. The counter element is preferably in the form of three gear wheels of which one for blocking the two further gear wheels which in each case per se engage in a toothing of the sleeve part.

The force accumulator unit is disposed on a side of the inner sleeve on which a counter element which ensures a form-fit or force-fit, and thus locking, is disposed. First, the locking device is moved to a sealing bearing position on the internal wall or the internal surface of the respective pipeline by expanding the inner sleeve. The force accumulator unit herein is impinged with a force corresponding to the force applied in the expansion. A force accumulator unit which is configured as a spring element or another compressible element is in particular conceived such that said force accumulator unit on account of the force created herein is compressed or pulled either not at all or only slightly in the circumferential direction. In the case of latching or clamping devices, a slight reduction of the diameter of the inner sleeve will typically initially take place again on account of the operating position being assumed, since there is a dead distance, or associated play, respectively, in the locking device that is required for assuming the clamping or latching position. This herein is, for example, a displacement path required for assuming the clamping action, or the play required for mutually meshing gear wheels to transfer to a clamping position.

Subsequently, a part of the inner sleeve on which the counter element in particular is mounted is displaced in such a manner by activating a tensioning means that the effective length of this part of the inner sleeve that is required for bracing in the pipeline is enlarged, wherein the force accumulator unit is pre-tensioned or tensioned, respectively, and an enlargement of the diameter is achieved. A part of the inner sleeve is in particular displaced in the circumferential direction, and the parts of the inner sleeve that are already situated in a locked position are thus mutually released from this position again and brought to slide along one another. The displacement path that is able to be provided by the force accumulator unit to this end is preferably the same size or larger than the dead path for assuming the locking position of the locking device. When activating the tensioning means, which is configured as a bell-crank lever, for example, the region of a band of an inner sleeve that is effective for tensioning is thus lengthened, and the counter element is supported on a toothing of the further band, for example, such that the elongation or expansion, respectively, leads to a stronger bracing in the respective line.

Alternatively, a bracing in the longitudinal direction of the respective pipeline by way of rotating or pivoting deflection levers can also lead to an enlargement of the circumference of the inner sleeve. Alternative configurations of the tensioning means can have, for example, a cam or a trigger for already pre-tensioned force accumulators, for example also the force accumulator unit of the locking device. Tension could likewise also be applied by way of one or a plurality of soldered or brazed points which expand when heated.

The force accumulator unit can preferably be embodied in the form of a leaf spring, for example, in a main part of an insert that is at least substantially produced from metal. Alternatively, it is also conceivable for the force accumulator unit to be connected, for example by welding or riveting, in particular to the outer part of an inner sleeve in terms of a radial longitudinal central axis. To this extent, the force accumulator unit in this instance is configured so as to be insertable into the inner sleeve.

A particularly reliable incorporation of the force accumulator unit is provided when it is disposed in the circumferential direction on both sides of a base element that forms the counter element. Exact positioning of the force accumulator unit and the locking unit, which is conjointly configured with the force accumulator unit, in the line is possible on account of the mounting of the base element preferably provided in the circumferential direction.

In order for a pre-tension to be applied, the locking device is preferably provided with a tensioning means, wherein the locking device is configured so as to be self-locking and/or latching. Such a tensioning means can be activated once the inner sleeve has been expanded, this being caused in a conventional manner, for example by an inflatable hollow member in the line. To this end, the tensioning means is preferably configured so as to project inward, that is to say in the direction of a longitudinal central axis, or so as to be activated from at least this side, for example through a clearance of an inner part of an inner sleeve. The tensioning means is in particular configured as a bell-crank lever by way of which the force accumulator unit can be braced in relation to an external part of the inner sleeve or else in relation to an internal part of the inner sleeve, depending on the configuration. A force is applied to a part of the locking device, in particular a base element, on which the counter element is mounted, for example, by way of the force accumulator unit, wherein the counter element on account of the applied force is supported on the sleeve part that has the toothing, for example, and on account thereof expands the inner sleeve. Depending on the basic design of the force accumulator unit, the latter is already tensioned herein, or upon reaching a pre-definable counter pressure that acts counter to any further expansion of the inner sleeve. The introduction of the force leads to pre-tensioning of the force accumulator unit, which is subsequently available for the inner sleeve for a long time after a locking position has been assumed. In particular, a dead path required for transferring the locking device to its locking position after an expansion of one of the inner sleeves is at most as long as a displacement path of the force accumulator unit. For example, a maximum stroke or displacement path, respectively, of the force accumulator unit is longer than the spacing of equilateral flanks of two neighboring teeth of the toothing.

According to a particularly simple refinement of the invention, the tensioning means can be also be configured as a bell-crank lever that is integral to the force accumulator unit, as well as in particular furthermore be configured so as to be integral to the counter element. For example, this functional part is supported by way of the teeth of that part of the inner sleeve that has the toothing, on the one hand, and in relation to the further sleeve part that in this instance moves relative thereto, on the other hand, while the force accumulator unit is simultaneously configured in a conjointly integral manner.

In order for the bracing situation of the force accumulator element and/or the tension prevailing on the inner sleeve to be checked, a pre-tension indicator which is preferably configured by two elements, in particular of an inner or outer part of the inner sleeve, that are movable relative to one another, can be provided. It can thus be later checked by way of a simple visual check, even months after the installation of the device, whether a required bracing in relation to the internal wall of the respective pipeline is provided.

The object according to the invention in terms of a secure disposal of the sealing device in the pipeline is also correspondingly achieved by an inner sleeve having a locking device which is configured as described above or below, wherein this locking device is configured for use in a sealing device according to one of claims 13 to 21. Unless the inner sleeve is configured so as to be integral to the insert, said inner sleeve is correspondingly provided with the features described above or below. Said inner sleeve is thus in particular provided with a locking device as described above, said locking device being configured so as to be self-locking and/or latching, and has a tensioning means for applying a pre-tension, wherein a dead distance required for transferring the locking device to the locking position thereof, in particular after an expansion of the inner sleeve, is smaller than a displacement path of any potentially present force accumulator unit, and a maximum displacement path of the force accumulator unit is at least as long as the spacing of equilateral flanks of two neighboring teeth of a toothing of a part of the inner sleeve, for example. In particular, the inner sleeve is furthermore provided with a locking device which comprises at least one force accumulator unit which is preferably configured as a spring element and which by transferring the inner sleeve is pre-tensioned to an operating position.

The object set at the outset is likewise achieved by a method for sealing a transition between a main line and a branch line, having a sealing device configured according to one of claims 1 to 21. The sealing device herein has an insert having a main part and a connector, wherein the insert is incorporated in the main line, and the connector is in particularly subsequently incorporated in the branch line, wherein the main part is braced in the main line by way of at least one expandable inner sleeve, and the connector is braced in the branch line in the branch line by way of at least one second expandable inner sleeve. The afore-described advantages of reliable and in particular durable sealing of the pipeline, or main line and branch line, respectively, are beneficial to this method according to the invention.

At least one further, third inner sleeve is preferably braced in the main line, wherein the two inner sleeves provided for establishing the main part are disposed so as to be spaced apart from one another and in particular on different sides in relation to the connector in the main part.

In particular, the connector of the at least two-part insert is established on the main part by way of the flexurally stiff main part. This takes place in particular by way of sealing regions or contact regions, respectively, in which the flexurally stiff main part establishes the collar of the connector that preferably reaches into the main line.

According to one further configuration according to the invention, a sealing region of the connector and/or of the main part by way of a seal situated therein is brought to bear on an internal surface of the main line and/or the branch line.

On account of the in particular flexurally stiff configuration of the main part, the connector by way of the collar thereof preferably in the main line is braced in relation to an in-liner present therein, for example, such that a second sealing plane for sealing any potential damage in the transition region is provided by the bearing action of the inner sleeve, on the one hand, and by way of the bracing of the sealing region of the connector on the main line, on the other hand. The inner sleeve on the sides of the connector, the regions that at the end side lie remote from that part of the connector that is disposed on the main line, can also be provided with one or a plurality of sealing planes. The method is moreover also suitable for linking branch lines to main lines which have been retrofitted with (in-)liners.

In order to avoid the inner sleeves being loosened, one of the inner sleeves after initial bracing can be post-tensioned by a tensioning means, wherein the tension can in particular be checked upon installation, preferably by way of a pre-tension indicator. A force accumulator unit of the inner sleeve can simultaneously be tensioned during the post-tensioning. The post-tensioning leads to the force accumulator unit being pre-tensioned for potential subsequent expansions of the pipe or displacements of points of rupture, for example by virtue of a displacement of the soil.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Individual technical features of the exemplary embodiments described below can also be combined with exemplary embodiments described above as well as with the features of the independent claims and any potential further claims so as to form subject matter according to the invention. Where expedient, elements of equivalent functions are provided with the same reference signs.

Figure 1:
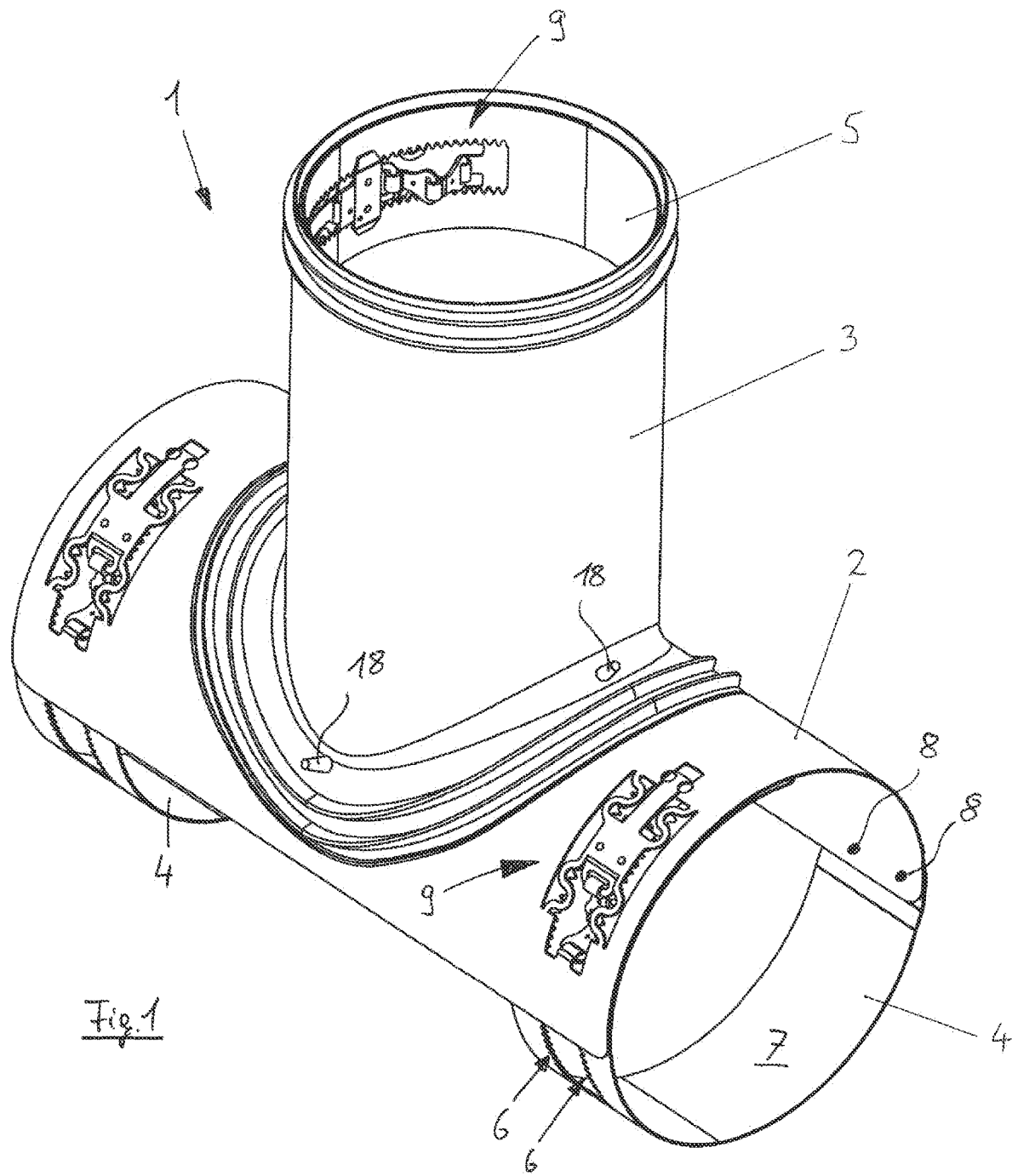
FIG. 1 shows a subject matter according to the invention in a first view.

A sealing device according to the invention according to FIG. 1 for sealing a transition between a main line and a branch line comprises an insert 1 which has a main part 2 to be disposed in the main line, and a connector 3 to be disposed in the branch line. A first expandable inner sleeve 4 is partially configured so as to be integral to the main part 2. The inner sleeve 4, apart from sleeve part 7 which has a toothing 6 and is configured as a band and by way of weld points 8 is connected to the inner sleeve 2, herein comprises a locking device 9 which is yet to be described in more detail hereunder. Said locking device 9 is partially configured so as to be integral to the main part 2 such that the inner sleeve 4 is also partially configured so as to be integral to the main part 2.

The inner sleeve 4 serves for establishing the main part 2 in the main line. A further inner sleeve 5 which is likewise provided with a locking device 9 serves for establishing the connector 3.

A further inner sleeve 4 for establishing the main part is disposed so as to be spaced apart from the inner sleeve on the right in FIG. 1, and on a side on the main part 2 that is different in terms of the connector. The flexurally stiff main part, which is configured substantially from a sheet metal, in particular from stainless steel, can be conjointly established in the main line by way of these two inner sleeves 4. The inner sleeves 4 serve for establishing the main part 2 by bracing the latter in relation to the internal wall of the main line.

The main part 2 as well as the connector 3 have collar-shaped sealing regions 11, 12. While the sealing region 12 of the main part 2 (cf. FIG. 6) has two encircling seal lips 13 which serve for bearing in a sealing manner on the lower side of the sealing region 11, the connector 3 has seals 14 which are to be disposed in the direction of an internal surface of the main line. By pressing the sealing region 11 against an internal surface of the main line by means of the main part 2, the connector thus assumes a tight fit which is able to seal any potential leakages in the transition region between the main line and the branch line, or facilitates the transition from a liner disposed in the main line to the branch line, respectively. The main part 2 furthermore has a collar 16 which is provided with an undercut and is able to latch to the inside of the connector 3.

Figure 2:
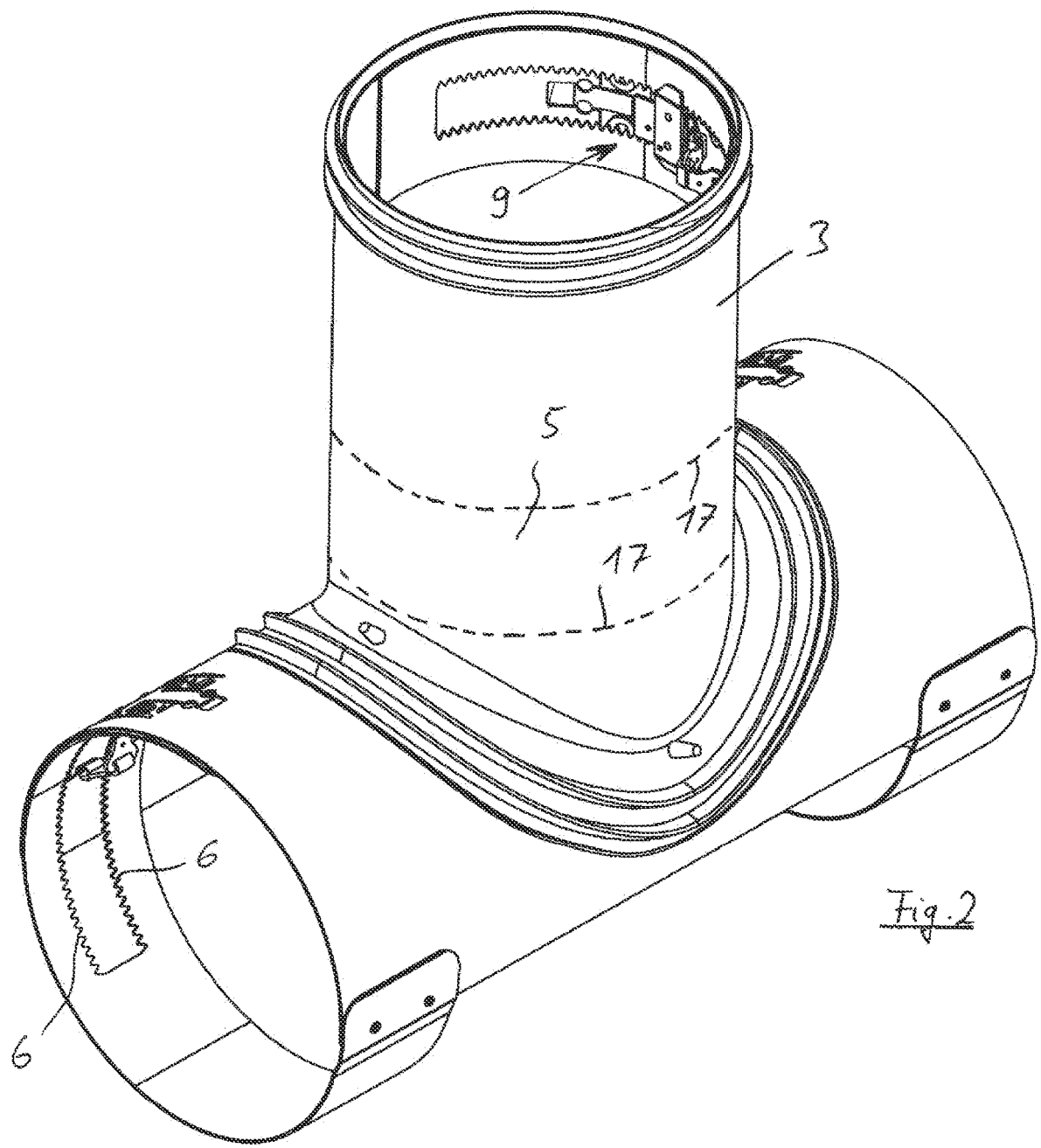
FIG. 2 shows the subject matter as per FIG. 1 in a further view.

A further inner sleeve 5 is disposed on the end of the connector 3 that is oriented towards the main line, this being indicated by dashed lines 17 (FIG. 2).

Valves 18 make it possible for a region that is situated between an internal surface of the pipe and the insert to be filled with a curing material from the line.

Figure 3:
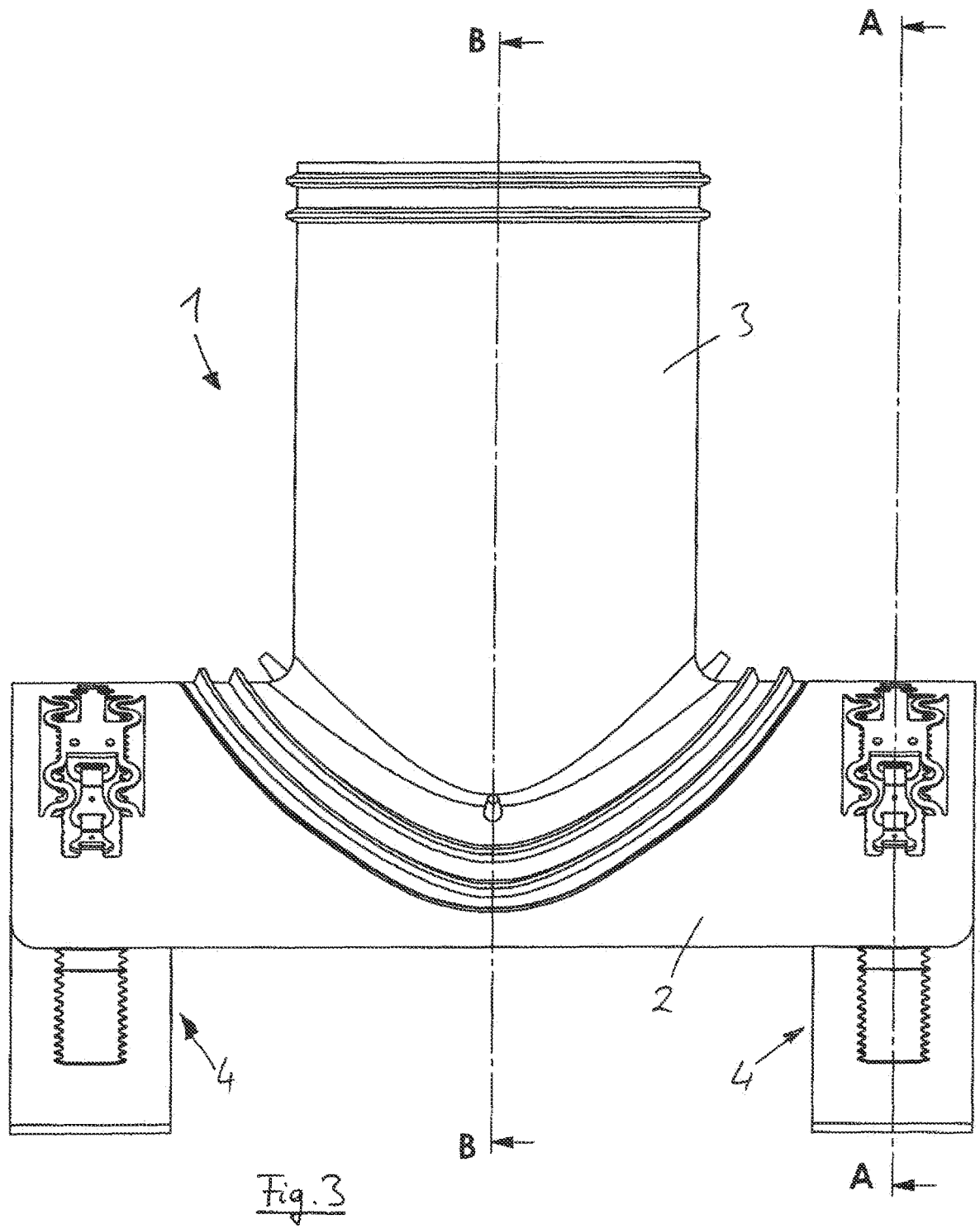
FIG. 3 shows the subject matter as per FIG. 2 in a lateral view.

Irrespective of any potential inner sleeves 4, the insert 1 in terms of the main part 2 thereof is configured for covering the main line by not more than 270°, when viewed in the longitudinal direction. Covering of only approximately 180° is presently provided (FIG. 3). The main part thus has approximately the shape of half a hollow cylinder which has a clearance for placing the connector 3. Said main part is thus significantly easier to transport in the pipeline and to move to the installation site than any main parts which cover the internal surface of the pipeline in a fully circumferential manner.

Figure 4:
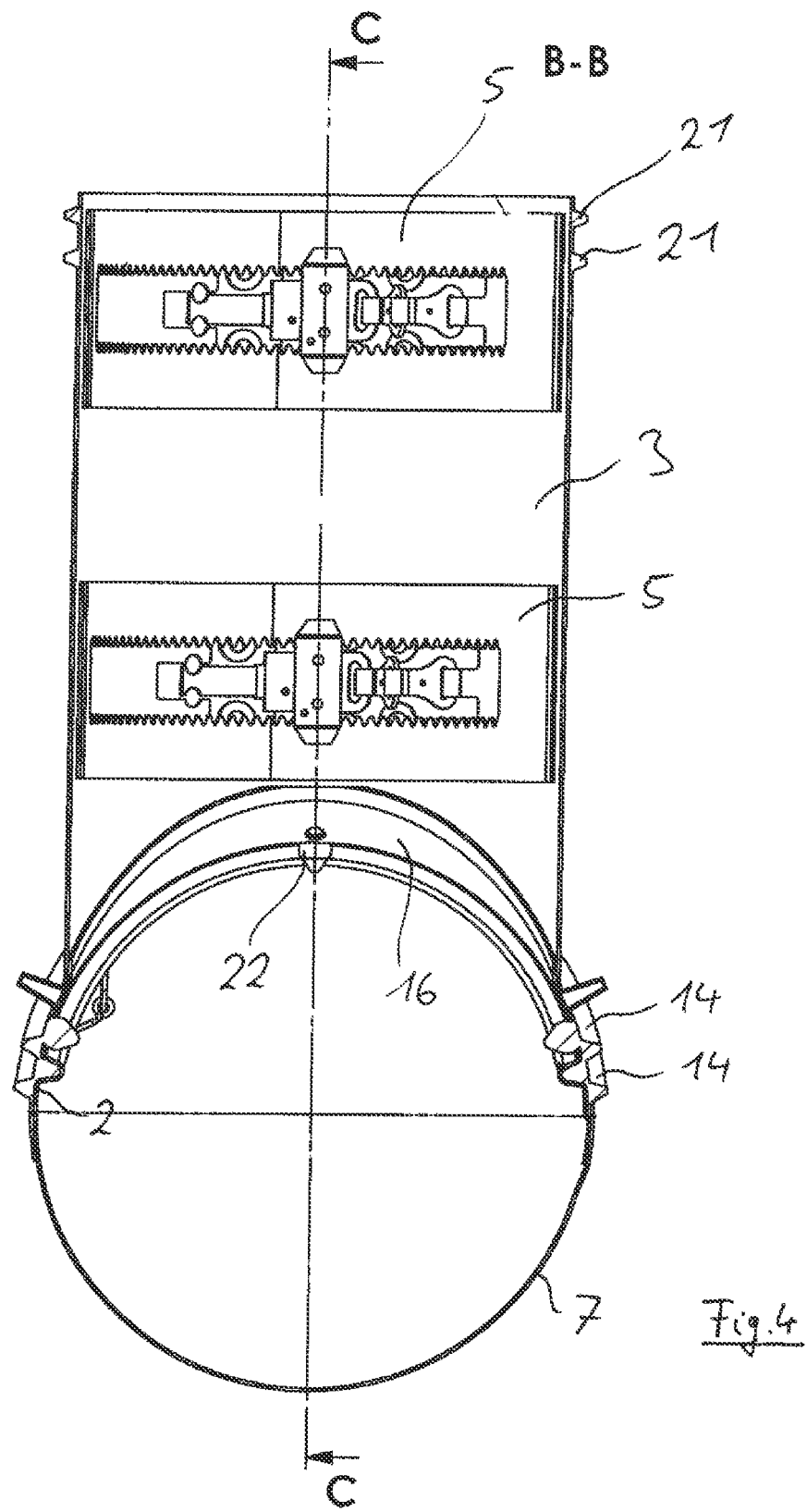
FIG. 4 shows the subject matter as per FIG. 3 along the section B-B.

The connector 3, which according to FIG. 4 is illustrated in a sectioned manner, is configured so as to be permanently flexible and at the upper end of said connector 3 in FIG. 4, which is to be introduced farthest into the branch line, is externally provided with connector seal lips 21 which by means of the inner sleeve 5 are pressed against the internal surface of the branch line. The lower inner sleeve 5 in FIG. 4 ensures a firm fit of the connector in the critical transition region to the main line. A fastening means 22 which in the manner of a mushroom head is to be introduced into an opening of the main part 2, in a manner similar to that of the collar 16 likewise serves for securely establishing the connector 3 on the main part 2.

Figure 5:
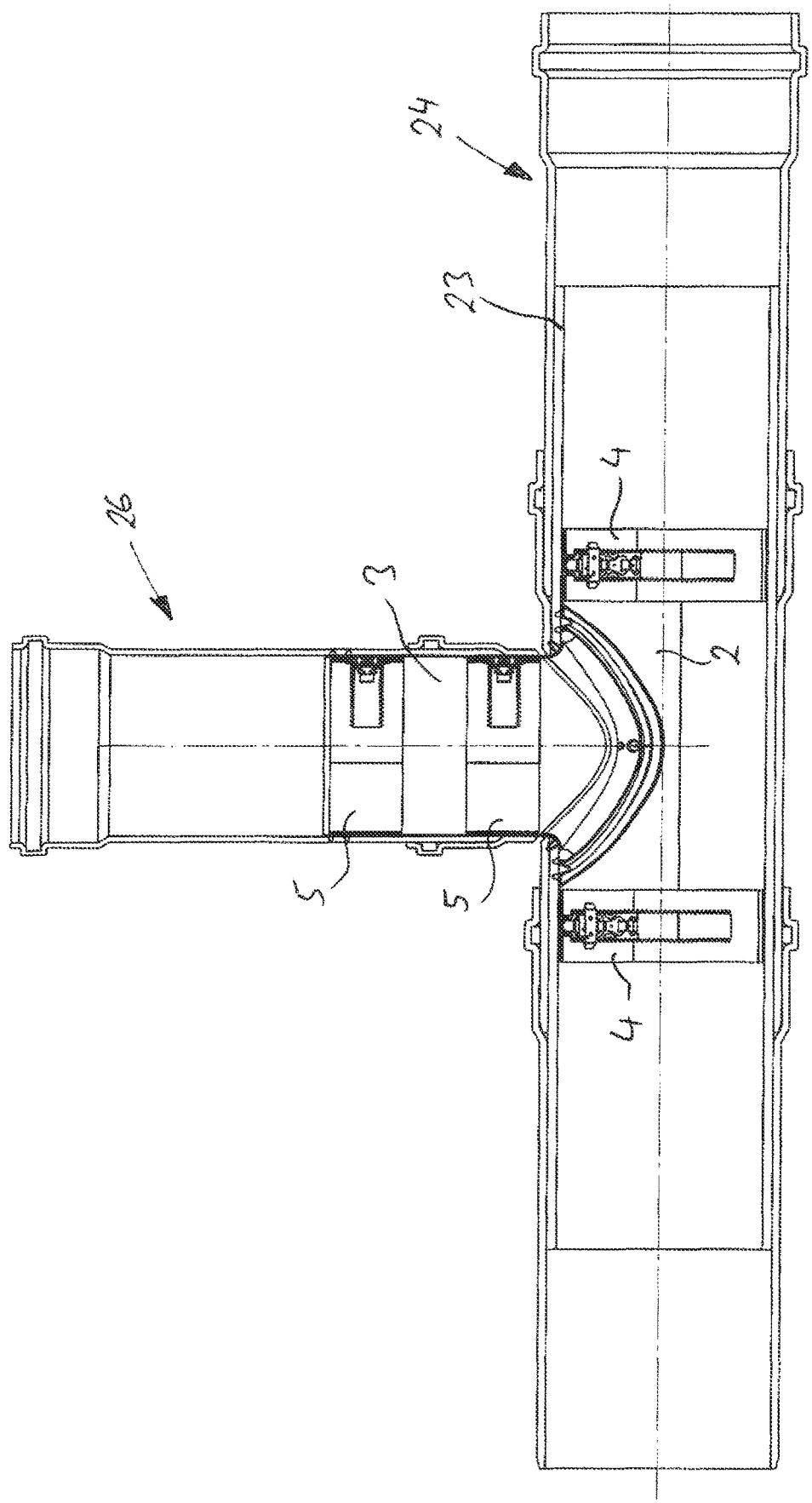
FIG. 5 shows a section through a subject matter according to the invention that is disposed in a main line and a branch line.

The sealing device can be disposed directly in a pipeline or a main line, respectively, which is not provided with a liner. Said sealing device can also be retrofitted in a pipeline provided with a liner 23 so as to seal a transition to a branch (FIG. 5). According to the exemplary embodiment according to FIG. 5, a main line 24 is provided with a branch in a branch line 26, wherein the main line 24 has been cladded with a liner 23. The sealing device now seals a transition region to the branch line 26 in that the connector 3 by way of the collar thereof is pressed in the direction of the internal surface of the main line that is presently configured by the internal surface of the liner 23. The flexurally stiff main part 2 herein is braced by the inner sleeves 4 and seals indirectly the connection between the connector and the liner. Inner sleeves 5 brace the connector 3 in the branch line. The connector 3 is thus firmly braced indirectly by the two inner sleeves 4 and the insert 2 as well as the two inner sleeves 5, wherein the transition region is sealed.

Figure 6:
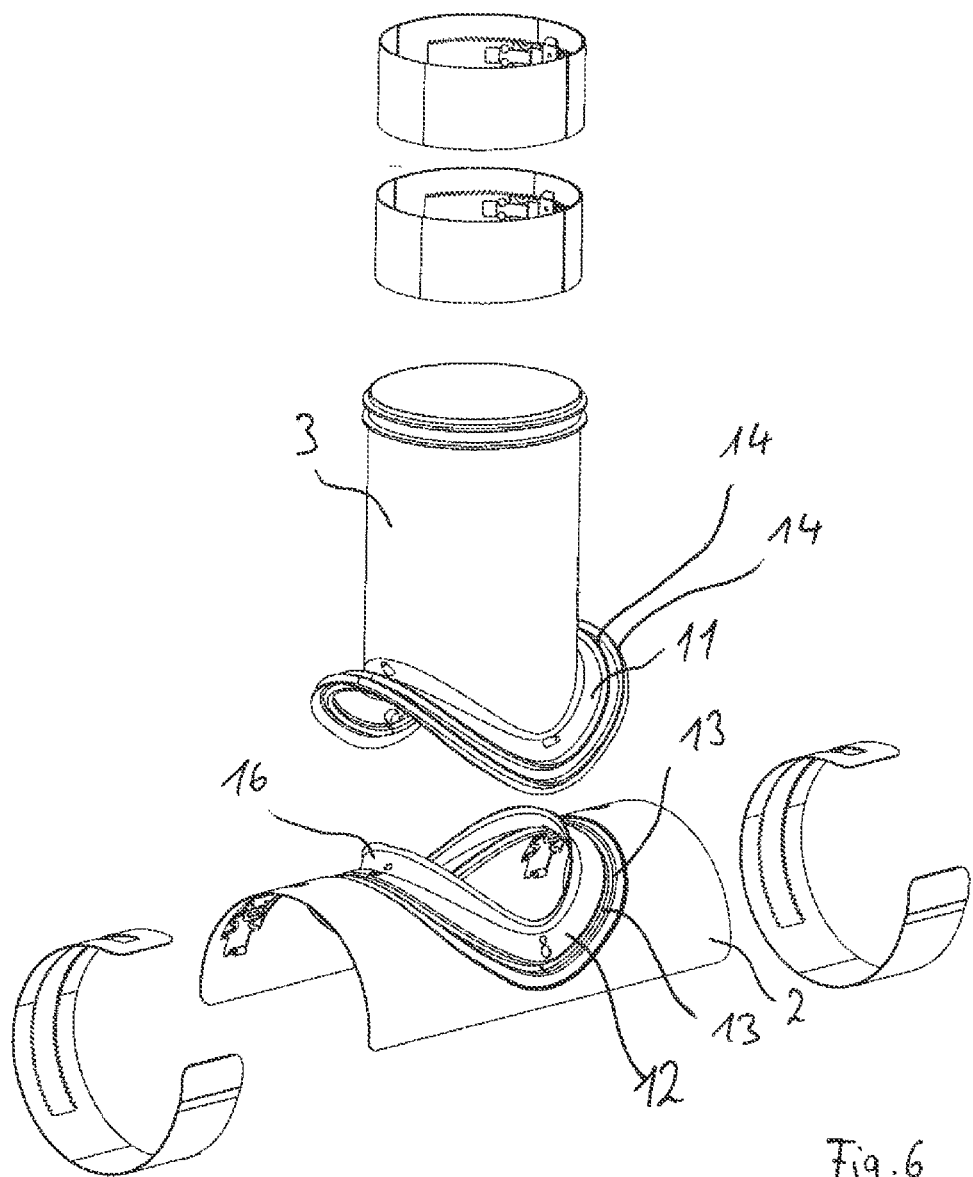
FIG. 6 shows an exploded illustration of the subject matter as per FIG. 1.

A sealing device according to the invention is illustrated in an exploded illustration according to FIG. 6. Parts of the locking device of an inner sleeve according to the invention which is discussed in more detail in the following figures are not illustrated in more detail.

Figure 7:
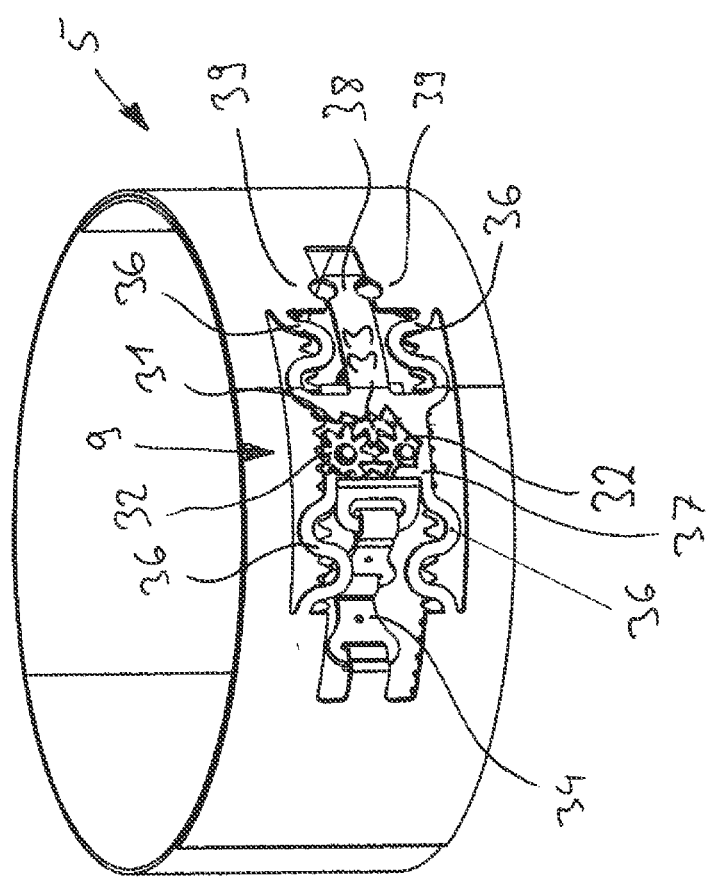
FIG. 7 shows an inner sleeve according to the invention in a non-tensioned shape.
Figure 8:
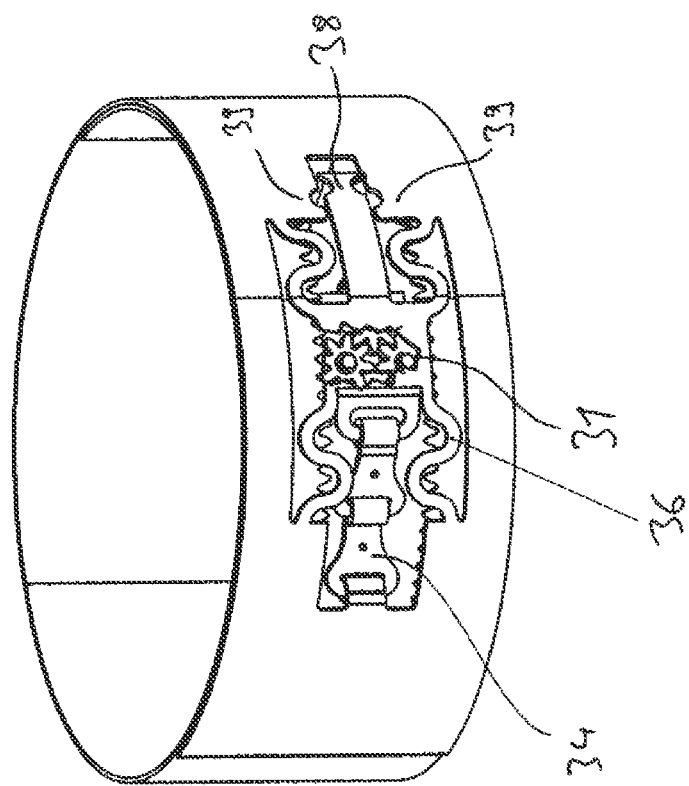
FIG. 8 shows the subject matter as per FIG. 7 in a tensioned operating position.

An inner sleeve according to the invention has in each case a locking device 9 which is in particular illustrated in more detail in FIGS. 7 and 8, or 9 and 10. The locking device 9 and the inner sleeve 5 in FIG. 7 are illustrated in a partially broken-away manner (line 31). On account thereof, counter elements 32 provided with teeth become visible. The two counter elements 32 (gear wheels) disposed on top of one another mesh with a blocking element 33 which is provided for blocking a reverse movement and is likewise configured in the form of a gear wheel.

On account of the inner sleeve 5 being expanded in the main line 24 or the branch line 26, the upper left counter element in the drawing rotates in a counter-clockwise manner, while the lower counter element 32 rotates in a clockwise manner. On account thereof, a locking element 33 which in a spring-loaded manner is held in a contact position and is likewise configured as a gear wheel is pushed away from the two counter elements 32 configured as gear wheels, this being the reason why the expansion is not impeded. After the inner sleeve 5 has been expanded, the locking element 33, by virtue of the recurring contact with the two now counter-rotating gear wheels, latches up to a locking position in which any further convergence of the inner sleeve is no longer possible. On account of the refinement of the inner sleeve 5 according to the invention described hereunder, the shrinking of the inner sleeve which could lead to a leakage in the pipe is prevented. To this end, a tensioning means 34 which presently is configured as a bell-crank lever is activated after the tensioning and the collapse caused by the dead path. On account thereof, the four curved strip-shaped regions 36 of the force accumulator unit present are tensile-loaded (to the left of the gear wheels) and compression-loaded (to the right of the gear wheels). On account of this activation of the tensioning means, a displacement of the counter elements which are presently mounted in the outer part takes place along the toothing, and in turn an expansion of the inner sleeve (FIG. 8) thus takes place. The introduced force leads to the counter elements 32 being supported on the toothing. The displacement path of the force accumulator element herein is larger than the dead path that has been bridged by the shrinkage of the inner sleeve 5 so that the inner sleeve can in turn be transferred to the expanded position.

On account of the force accumulator unit which in the circumferential direction is presently disposed on both sides of a base element 37 in which the counter element is mounted, the inner sleeve can additionally compensate for the influence of external forces, for example by virtue of displacements of the soil, without any structural damage to the inner sleeve taking place.

The tensioned position having an activated tensioning means 34 is shown in FIG. 4. Two regions 38 and 39, which are movable relative to one another and have semi-circular clearances that in the non-tensioned state represent in each case a circle, serve as a pre-tension indicator. The two semicircles of the regions 38 and 39 are mutually displaced in the tension state so that the tensioned position can be read even when the tensioning means 34 is removed, for example after transferring the locking device to the position illustrated in FIG. 8.

Figure 9:
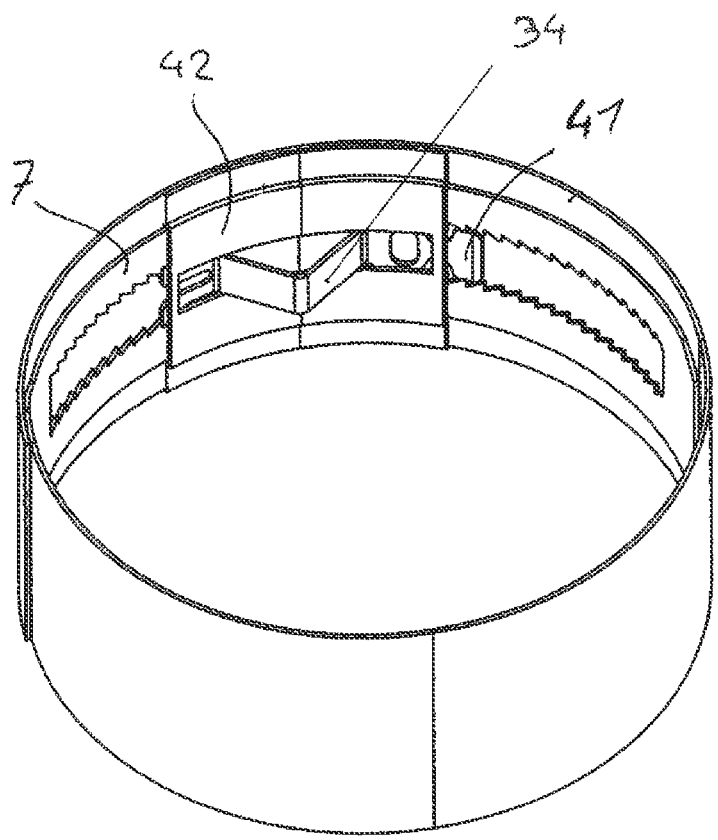
FIG. 9 shows a further embodiment of an inner sleeve according to the invention.
Figure 10:
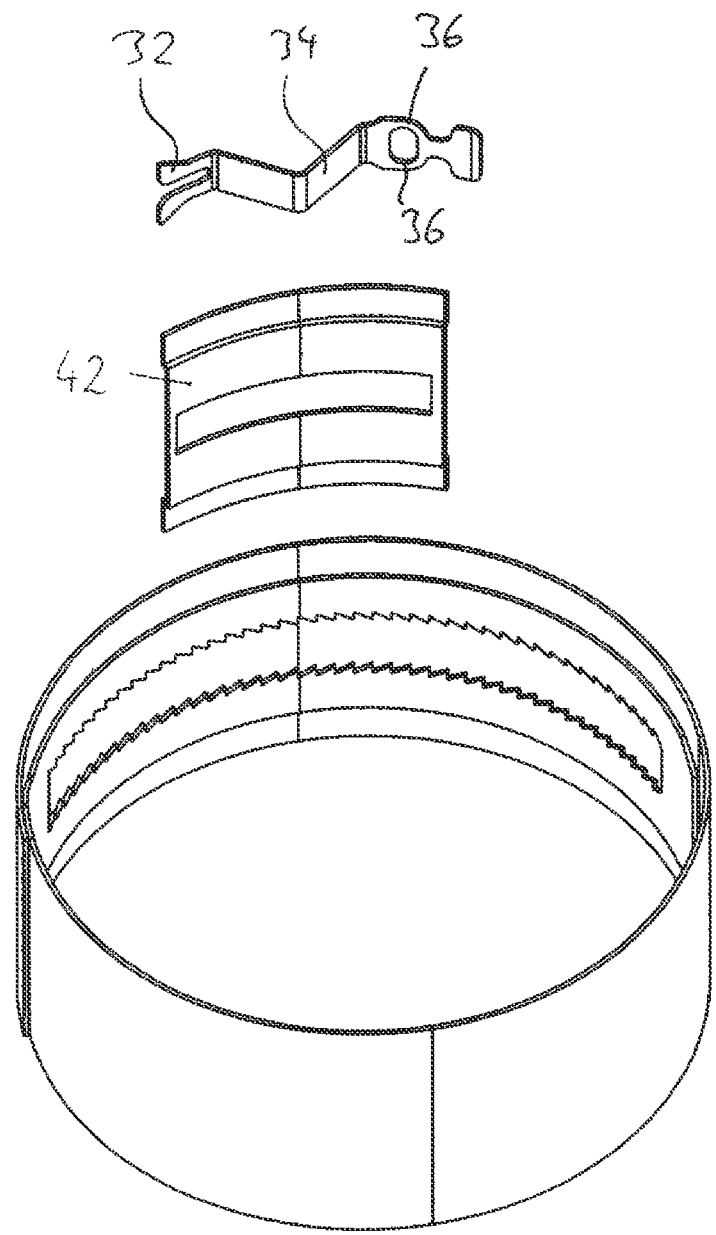
FIG. 10 shows the subject matter as per FIG. 9 in an exploded illustration.

A further exemplary embodiment of an inner sleeve according to the invention according to FIG. 9 is of a simpler construction. While the sleeve part 7 of the inner sleeve that is configured as a band again has on both sides toothings that delimit a clearance, the force accumulator unit, the tensioning means 34, and the counter element 32 are presently conjointly configured so as to be integral. This functional part by way of one end 41 thereof is supported on an external part of the inner sleeve, and subsequently transitions to resilient regions 36 which configure a force accumulator unit and on which in turn the tensioning means 34 is integrally molded, the latter in turn transitioning to two counter elements 32 which engage in the toothing. The functional element is held in the seat thereof in the clearance of the sleeve part 7 by way of a clip collar 42.

On account of an expansion which initially takes place by means of a usual positioning and expansion means in the form of an inflatable balloon in the pipeline, for example, the inner and the outer part of the inner sleeve are displaced relative to one another, wherein the teeth configured as counter elements 32 slide along the toothing in the clockwise manner so as to initiate an expansion of the inner sleeve. Once an expansion has led to the next tooth being incompletely leapfrogged, for example, which is why the inner sleeve in terms of the diameter thereof is then reduced again when discharging air, the required bracing can be re-established by way of the bell-crank lever and the relative displacement between the inner and the outer part of the inner sleeve. This is associated with an impingement of the force accumulator element, and similarly to the previous case, leads to a lengthening of that part of the inner sleeve that is supported on the toothing. The application of an excessive force on the inner sleeve is simultaneously delimited by the force accumulator unit formed by the two resilient regions 36. The force accumulator unit is thus configured in such a manner that said force accumulator unit, on account of the initial expansion by means of conventional means such as, for example, an inflatable balloon, is influenced to a lesser or only minor extent but on the other hand, by transferring the tensioning means, provides a sufficiently great force for expanding the inner sleeve across at least a displacement path which is the same or larger than the spacing of flanks of neighboring teeth of the toothing that are equilateral and in particular required for the establishing action (exemplary embodiment FIGS. 7, 8, 9, 10).

The invention claimed is:

1. A sealing device for sealing a transition between a main line and a branch line, the sealing device comprising:
    an insert having a main part disposed in the main line,
    a connector disposed in the branch line,
    a first expandable inner sleeve for bracing the main part in the main line, and
    at least a second expandable inner sleeve for bracing the connector in the branch line;
    wherein the insert is configured in two parts, wherein the main part as well as the connector have in each case one collar-shaped sealing region;
    wherein the sealing region seals the two parts of the insert in relation to one another;
    wherein at least one of the first expandable inner sleeve and the at least one second expandable inner sleeve is braced by the connector in relation to the branch line; and
    wherein the connector is composed at least partially of an elastomer.

2. The sealing device as claimed in claim 1, further including a further, third inner sleeve for establishing the main part in the main line, wherein the two inner sleeves provided for establishing the main part are disposed so as to be mutually spaced apart on different sides in relation to the connector in the main line.

3. The sealing device as claimed in claim 1, wherein at least one of the inner sleeves is braced by way of the main part in relation to the main line.

4. The sealing device as claimed in claim 1, wherein the insert on an inside has contact faces that are adapted to the size of the inner sleeves.

5. The sealing device as claimed in claim 1, wherein the sealing region of the connector and/or of the main part has at least one seal which is to be disposed in the direction of an internal surface of the main and/or branch line.

6. The sealing device as claimed in claim 1, wherein the insert has at least one fastening means for fastening the main part and the connector to one another.

7. The sealing device as claimed in claim 5, wherein the main part is at least substantially an expandable, flexurally stiff molded part, which in particular when viewed in the longitudinal direction, and irrespective of any inner sleeves, covers the main line by not more than 270°.

8. The sealing device as claimed in claim 1, wherein a material of that part of the connector that is disposed in the branch line is permanently flexible, and/or that part has a wall region which is deflected multiple times so as to improve the adaptation of the connector.

9. The sealing device as claimed in claim 1, comprising at least one valve configured by an eversion of the insert.

10. The sealing device as claimed in claim 1, wherein at least one inner sleeve is conjointly configured by the main part.

11. The sealing device as claimed in claim 1, further comprising at least one inner sleeve having a pre-loadable locking device.

12. The sealing device as claimed in claim 11, wherein the locking device comprises at least one force accumulator unit which is configured as a spring element and is pre-loaded by transferring the inner sleeve to an operating position.

13. The sealing device as claimed in claim 12, wherein the inner sleeve comprises at least one sleeve part which is provided for a force-fit or form-fit, and a further part of the inner sleeve that in the radial direction is adjacent to said sleeve part has the force accumulator unit and at least one counter element provided for the force-fit or form-fit.

14. The sealing device as claimed in claim 13, wherein the sleeve part has a toothing and the counter element comprises one tooth.

15. The sealing device as claimed in claim 13, wherein the force accumulator unit is integral to the inner sleeve or insertable into said inner sleeve.

16. The sealing device as claimed in claim 15, wherein the force accumulator unit in the circumferential direction is disposed so as to be on both sides of a base element on which the counter element is mounted.

17. The sealing device as claimed in claim 11, wherein the locking device is configured so as to be self-locking and/or latching, and has a tensioning means that is provided for applying a pre-load.

18. The sealing device as claimed in claim 17, wherein upon an expansion of one of the inner sleeves, a dead range required for transferring the locking device to the locking position thereof is at most the length of a displacement path of the force accumulator unit.

19. The sealing device as claimed in claim 11, further including a pre-tension indicator which is preferably configured by two elements that are movable relative to one another, in particular an inner part or an outer part of the inner sleeve.

20. A method for sealing a transition between a main line and a branch line, said sealing device comprising an insert having a main part and a connector, the method including the steps of:

incorporating the insert into the main line;
subsequently incorporating the connector into the branch line,
bracing the main part in the main line by way of at least one expandable inner sleeve, and
bracing the connector in the branch line by way of at least a second expandable inner sleeve;
wherein the insert is configured in two parts, wherein the main part as well as the connector have in each case one collar-shaped sealing region; and
wherein the connector is composed at least partially of an elastomer.

21. The method as claimed in claim 20, wherein the main part is braced in the main line by way of a further, third inner sleeve, wherein the two inner sleeves provided for establishing the main part are disposed so as to be mutually spaced apart and in particular on different sides in relation to the connector in the main part.

22. The method as claimed in claim 20, wherein the connector of the at least two-part insert is established on the main line by way of the main part, which is flexurally stiff.

23. The method as claimed in claim 20, wherein a sealing region of the connector and/or of the main part by way of a seal situated therein is brought to bear on an internal surface of the main line and/or the branch line.

24. The method as claimed in claim 20, wherein one of the inner sleeves after initial bracing is post-tensioned by a tensioning element.

25. The method as claimed in claim 24, wherein a force accumulator unit of the inner sleeve is tensioned during the post-tensioning.

* * * * *

UNITED STATES PATENT AND TRADEMARK OFFICE
CERTIFICATE OF CORRECTION

| | | |
|---|---|---|
| PATENT NO. | : 11,525,536 B2 | |
| APPLICATION NO. | : 17/256481 | |
| DATED | : December 13, 2022 | |
| INVENTOR(S) | : Christoph Wenk | |

It is certified that error appears in the above-identified patent and that said Letters Patent is hereby corrected as shown below:

On the Title Page

In the Abstract:
In Line 5, delete "fine" and replace with -- line --

In the Specification

In Column 3, Line 44, delete "fine" and replace with -- line --

Signed and Sealed this
Twenty-fifth Day of June, 2024

Katherine Kelly Vidal
*Director of the United States Patent and Trademark Office*